(12) United States Patent
Harris

(10) Patent No.: US 11,999,898 B2
(45) Date of Patent: Jun. 4, 2024

(54) COMPOSITION AND METHOD OF REDUCING DEPOSITION OF FORMATE IN UNDERGROUND FORMATIONS

(71) Applicant: CLEANSORB LIMITED, London (GB)

(72) Inventor: Ralph Edmund Harris, The Woodlands, TX (US)

(73) Assignee: CLEANSORB LIMITED, Greater London (GB)

( * ) Notice: Subject to any disclaimer, the term of this patent is extended or adjusted under 35 U.S.C. 154(b) by 0 days.

(21) Appl. No.: 18/034,271

(22) PCT Filed: Oct. 28, 2021

(86) PCT No.: PCT/GB2021/052795
§ 371 (c)(1),
(2) Date: Apr. 27, 2023

(87) PCT Pub. No.: WO2022/090717
PCT Pub. Date: May 5, 2022

(65) Prior Publication Data
US 2024/0026211 A1    Jan. 25, 2024

(30) Foreign Application Priority Data
Oct. 28, 2020   (GB) ...................... 2017079

(51) Int. Cl.
*C09K 8/528*     (2006.01)
(52) U.S. Cl.
CPC .................. *C09K 8/528* (2013.01)
(58) Field of Classification Search
None
See application file for complete search history.

(56) References Cited

U.S. PATENT DOCUMENTS

| 8,657,008 | B2 | 2/2014 | Harris et al. | |
|---|---|---|---|---|
| 9,493,697 | B2 | 11/2016 | Luyster et al. | |
| 2005/0034868 | A1 | 2/2005 | Frost et al. | |
| 2008/0078549 | A1 | 4/2008 | Moorehead et al. | |
| 2014/0303047 | A1 | 10/2014 | McDaniel et al. | |
| 2016/0130496 | A1* | 5/2016 | Holtsclaw ............ | C09K 8/685 507/224 |
| 2016/0177698 | A1* | 6/2016 | Schultheiss ............ | C09K 8/805 166/305.1 |
| 2016/0333256 | A1* | 11/2016 | Harris ..................... | E21B 37/00 |
| 2017/0362499 | A1* | 12/2017 | Welton ................. | C07C 43/135 |
| 2018/0298269 | A1* | 10/2018 | Jamison ................ | C09K 8/665 |

FOREIGN PATENT DOCUMENTS

| GB | 2511624 | 9/2014 |
|---|---|---|
| WO | WO 2016/108877 | 7/2016 |

OTHER PUBLICATIONS

International Search Report and Written Opinion issued in Corresponding PCT Application No. PCT/GB2021/052795, dated Feb. 28, 2022.
Search Report issued in Corresponding British Application No. GB2017079.1, dated Jun. 15, 2021.

* cited by examiner

*Primary Examiner* — John J Figueroa
(74) *Attorney, Agent, or Firm* — NORTON ROSE FULBRIGHT US LLP

(57) ABSTRACT

A process is disclosed that includes providing a mixture to a wellbore. The mixture can comprise formic acid or a formic acid precursor, a salt of lactic acid, and a salt of gluconic acid. The mixture can be introduced into an underground formation around the wellbore. The mixture can prevent or at least reduce the formation of formate crystals as compared to mixtures without the salt of lactic acid or the salt of gluconic acid. The mixture permits the formic acid, or formic acid produced from hydrolysis of the formic acid precursor, to react with acid soluble material in the underground formation to generate soluble calcium salts.

24 Claims, No Drawings

COMPOSITION AND METHOD OF REDUCING DEPOSITION OF FORMATE IN UNDERGROUND FORMATIONS

CROSS-REFERENCE TO RELATED APPLICATION

This application is a national phase application under 35 U.S.C. § 371 of International Application No. PCT/GB2021/052795, filed Oct. 28, 2021, which claims priority to and the benefit of United Kingdom Application No. 2017079.1, filed Oct. 28, 2020. The contents of the referenced patent applications are incorporated into the present application by reference.

BACKGROUND

Acidizing of an underground formation with formic acid or a formic acid precursor may be used to dissolve calcium carbonate present in a reservoir drill-in fluid filter cake, in the rock matrix or in certain oilfield scales. Formic acid or a formic acid precursor may also be used to dissolve other formic acid-soluble materials that contain calcium which may be present in the wellbore, tubulars or formation. These may include but not be limited to calcium magnesium carbonate, chalk, dolomite, marble, calcite, or aragonite.

Dissolution of calcium carbonate or other acid-soluble materials containing calcium with formic acid results in the formation of calcium formate. When using low concentrations of formic acid, including formic acid derived from formic acid precursors, calcium formate generally remains in solution. However, when using higher concentrations of formic acid or formic acid precursor, or when acidizing in calcium or formate brines, a recognized problem is that a significant portion of the calcium formate generated by the reaction of formic acid with acid soluble materials comes out of solution as a crystalline solid. This is undesirable as crystals may clog screens, pumps or other equipment. There is therefore a need for technical solutions that can avoid the formation of calcium formate crystals when acidizing with formic acid or with a formic acid precursor.

U.S. Pat. No. 9,493,697 teaches that including an alkyl glucoside surfactant in a filter cake breaker treatment formulation may prevent the deposition of calcium formate when using a formic acid precursor.

U.S. Pat. No. 9,493,697 also teaches the use of a chelant (particularly iminodiacetic acid or salts thereof, to provide filter cake cleanup solutions while avoiding the precipitation of calcium formate. U.S. Pat. No. 9,493,697 teaches use of a premixed concentrate of chelant, formic acid precursor and water mixed in particular concentration ratios. The concentrate is diluted to provide the active filter cake breaker formulation.

However, a number of embodiments require the use of an "acidic buffering agent" (e.g. HCl) in the breaker fluid to maintain a low pH and avoid the formation of precipitates, especially precipitates of the iminodiacetic acid salts. For example, when glutamic acid-N,N-diacetic acid (salt) is utilized, the pH of the aqueous phase should be maintained below a level of about 3 in order to avoid the formation of calcium glutamic acid-N,N-diacetic acid precipitate. Use of acid with an acid precursor removes one of the main benefits of using an acid precursor. The added free acid would be immediately available for reaction with calcium carbonate, for example calcium carbonate present in a filter cake etc., so the delay in breakthrough of a filter cake which is achievable when using an acid precursor alone will not be obtained.

In order to obtain the benefits of in-situ acid generation and prevent premature dissolution of acid soluble material, it is desirable for filter cake breaker formulations based on acid precursors to be usable without the need of added acid.

Accordingly, there is a need for further acidizing processes and treatment fluids based on formic acid precursors where the precipitation of calcium formate is reduced or abolished but absent the inclusion of any "acid buffering agent" as taught by U.S. Pat. No. 9,493,697.

DETAILED DESCRIPTION

Acidizing of an underground formation with formic acid or a formic acid precursor may be used to dissolve calcium carbonate present in a reservoir drill-in fluid filter cake, in the rock matrix or in certain oilfield scales. Acidizing may also dissolve other formic acid-soluble materials that comprise calcium which may be present in the wellbore, tubulars or formation. Acidizing is a common oilfield operation. The aims of such oilfield acidizing treatments may include the stimulation of oil or gas production from the wellbore, increasing the injectivity for gas or water, removal of filter cakes arising from drilling of a wellbore, or the removal of scale that is present in the wellbore, tubulars or formation. Acidizing may also be used on water wells.

When acidizing using higher concentrations of formic acid or formic acid precursor, or when acidizing in calcium or formate brines, the precipitation of calcium formate from solution will occur if the solubility of calcium formate in the treatment fluid is exceeded. Those situations where calcium formate deposition is likely will be apparent to those skilled in the art, or may be readily determined by them using simple tests, such as jar tests or filter cake break tests.

In such circumstances, where calcium formate deposition is predicted, or observed to occur, the process of the present disclosure provides a means by which the deposition can be reduced or prevented. The process employs two additives in combination that are added at a sufficient concentration and in a suitable ratio to the acidizing treatment fluid to reduce or prevent the deposition of calcium formate.

In an embodiment, the two additives are salts of carboxylic acid. For example, the carboxylic acid salt additives can be salts of lactic acid and gluconic acid. Non-limiting examples of the salts include sodium lactate and sodium gluconate, but other salts including but not being limited to potassium lactate, potassium gluconate, ammonium lactate and ammonium gluconate may also be suitable. In situations where it is known or predicted that calcium formate will be deposited following acidizing, a sufficient concentration of the carboxylic acid salts can be added to the acidizing formulation to minimise and/or prevent any deposition of calcium formate. The molar concentration of each salt will vary based on the application and conditions. As an example, the molar concentration of each salt may generally be at least 0.6 M and can be in the range of 0.8 to 1.0 M. With respect to the ratio of each of the additives, these too can vary depending on application and conditions. In an embodiment, equimolar concentrations of each carboxylic acid salt can be used. A person having ordinary skill in the art in consideration of the conditions and the salts of carboxylic acids will appreciate that higher or lower concentrations may be used and different molar ratios may be selected if effective.

As an example of the use of the additives, the additives can be added to an acidizing formulation comprised of acid precursors, such as formic acid precursors. In another embodiment, the additives can be added to an acidizing formulation based on acid, such as formic acid. Suitable formic acid precursors will be known to those skilled in the art and include but not being limited to formic acid esters of polyols such as diethylene glycol monoformate, diethylene glycol diformate, ethylene glycol monoformate, ethylene glycol diformate, glycerol monoformate, glycerol diformate or glycerol triformate. Formic acid esters of simple alcohols include but are not limited to methanol, ethanol, propanol and butanol may also be used. Other suitable formic acid precursors are orthoesters, including but not being limited to those disclosed in U.S. Patent Publication No. 2005/0034868 to Frost et al.

While various formic acid precursors can be used, it may be most desirable to utilize formic acid precursors having a low hazard and toxicity with a high flash point and high environmental acceptability. Other considerations include solubility and biodegradability. For example, solubility in water or oilfield brines on the order of at least 10% and preferably at least 20% on a volume basis can be beneficial and/or desired. Generally, these will also be biodegradable to an acceptable extent.

The formic acid precursor can hydrolyse at a predictable rate in the presence of water to generate an organic acid. Those skilled in the art will understand that in-situ acid generation from such precursors will generally deliver significantly improved zonal coverage than fast reacting acids in various application, including in treatments to remove filter cakes.

One or more formic acid precursor may be included in an acidizing formulation. One or more formic acid precursor may also be used in combination with a live acid, such as formic acid, acetic acid. The chemicals required for the process of the present invention can be technical grade to reduce the cost of the process. The treatment fluids may be prepared by mixing the components in a suitable order as may be readily known or determined by one skilled in the art. The components of the formulation should be fully dissolved, but the use of emulsions of acid precursors is not excluded. Typically, the treatment fluid is prepared batch-wise in tanks or other suitable vessels. In some situations, the treatment fluid may be prepared "on the fly" by mixing one or more individual components on a continuous, preferably carefully controlled and monitored basis, as the fluid is injected into the underground reservoir. Other methods of preparing the treatment fluid will be well known to those skilled in the art.

The treatment fluid can comprise water which may be fresh, tap (city or drinking water), river or surface water, sea water or oilfield brines. In addition to acid or acid precursor plus the additives, such as carboxylic salts, the formulation may comprise additional components. The additional components will be selected according to the needs of the treatment. If acidizing a water-based drill-in fluid filter cake, it may be desirable to include a polymer breaker in the treatment fluid. This may be an oxidizing agent or enzyme, such as are taught for use in combination with organic acid precursors in U.S. Pat. No. 8,657,008, which is hereby incorporated by reference in its entirety. Oxidizing agents that may be usable include but should not be limited to peroxides, persulphates, perborates, percarbonates, perphosphates, hypochlorites, persilicates, hydrogen peroxide and magnesium peroxide. Enzyme that can be usable include but are not limited to enzymes that can hydrolyse starch, xanthan, cellulose, guar, scleroglucan, succinoglycan or derivatives of these polymers. If acidizing an oil-based drill-in fluid filter cake, it may be desirable to include surfactants and/or or solvents, including mutual solvents in the treatment fluid, such as will be known by those skilled in the art.

If the aim of the treatment is to dissolve oilfield scales and at least a portion of such scales are not soluble in any acid in the formulation, then it may be desirable to include chelating agents that can dissolve such scales. Suitable chelating agents will be known to those skilled in the art. Other additional components such as are commonly used in oilfield treatment formulations may also be included in the treatment fluid. These may include, but not be limited to, viscosifying agents, iron control agents or biocides.

The treatment fluid can be conveniently introduced into the underground formation via injection or production wells. The wells may be vertical, deviated, inclined or horizontal. If being introduced into a newly drilled well, particularly if being used to remove damage caused during drilling, such as filter cakes, the treatment fluid may conveniently be introduced through the drill string using the mud pumps. The treatment fluid may also be introduced via coiled tubing, bullheading or through a work string or wash pipe.

Following the introduction of the treatment fluid into the underground formation, a predetermined time should elapse for acidizing to proceed. The time required for acidizing at a particular formation temperature will be well known to those skilled in the art of acidizing with formic acid or formic acid precursors.

Optionally, the treatment fluid that is provided, or the mixture that is provided, does not contain an acidic buffering agent. Optionally, the treatment fluid that is provided, or the mixture that is provided, is not acidic. Optionally, the treatment fluid that is provided, or the mixture that is provided, has a pH of at least 4 or at least 5 or at least 6. Optionally, the treatment fluid that is provided, or the mixture that is provided, does not contain an alkyl glucoside surfactant. By the "treatment fluid that is provided" is meant the treatment fluid prior to its introduction into the underground formation. By the "mixture that is provided" is meant the mixture prior to its introduction into the underground formation.

The invention is illustrated by the following examples.

Example 1

This deposition of calcium formate when acidizing with higher concentrations of a formic acid precursor is illustrated by this example.

Solutions of between 5% w/v and 25% w/v of ORCA FG formic acid precursor (a commercial product available from Cleansorb) were made up in deionized water and 40 ml was placed in a 50 ml plastic capped tube. 5 g of calcium carbonate (5 micron) was added to the tube and the tube was incubated at 90° C. for 24 hours. This period of time was known to be sufficient to allow full hydrolysis of the formic acid precursor.

No calcium formate crystals were observed in the tubes which had initially contained 5% or 10% w/v ORCA FG. Calcium formate was observed in the tubes which had initially contained 15%, 20% or 25% w/v ORCA FG (Table 1).

TABLE 1

Presence of calcium formate crystals in spent acidizing solutions based on ORCA FG formic acid precursor heated to 90° C for 24 hours.

| | Initial concentration of ORCA FG formic acid precursor (% w/v) | | | | |
|---|---|---|---|---|---|
| | 5% w/v | 10% w/v | 15% w/v | 20% w/v | 25% w/v |
| Calcium formate crystals present | NO | NO | YES | YES | YES |
| Maximum millimolar Ca that could be released from excess calcium carbonate (calculated) | 0.309 | 0.617 | 0.926 | 1.234 | 1.543 |

Example 2

The deposition of calcium formate when acidizing with higher concentrations of a formic acid precursor is illustrated by this example.

Solutions of between 7.5% w/v and 37.5% w/v of ORCA FG3 formic acid precursor (a commercial product available from Cleansorb) were made up in deionized water and 40 ml was placed in a 50 ml plastic capped tube. 5 g of calcium carbonate (5 micron) was added to the tube and the tube was incubated at 90° C. for 24 hours. The period of time is known to be sufficient to allow full hydrolysis of the formic acid precursor.

No calcium formate crystals were observed in the tubes which had initially contained 7.5% or 15% w/v ORCA FG3. Calcium formate was observed in the tubes which had initially contained 22.5%, 30% or 37.5% w/v ORCA FG3 (Table 2).

TABLE 2

Presence of calcium formate crystals in spent acidizing solutions based on ORCA FG3 formic acid precursor heated to 90° C for 24 hours.

| | Initial concentration of ORCA FG3 formic acid precursor (% w/v) | | | | |
|---|---|---|---|---|---|
| | 7.5% w/v | 15% w/v | 22.5% w/v | 30% w/v | 37.5% w/v |
| Calcium formate crystals present | NO | NO | YES | YES | YES |
| Maximum millimolar Ca that could be released from excess calcium carbonate (calculated) | 0.298 | 0.596 | 0.893 | 1.191 | 1.498 |

TABLE 3

Effect of adding sodium gluconate and sodium lactate on the presence of calcium formate crystals in spent acidizing solutions based on ORCA FG formic acid precursor heated to 90° C for 24 hours. Initial concentration of ORCA FG formic acid precursor 25% w/v*

| | Concentration of sodium gluconate and sodium lactate M (each) | | | | |
|---|---|---|---|---|---|
| | 0.2M | 0.4M | 0.6M | 0.8M | 1.0M |
| Calcium formate present | Yes | Yes | Slight | None | None |

*sufficient to dissolve approximately 150 g of calcium carbonate per litre of formic acid precursor solution.

Example 3

The effect of adding lactate and gluconate salts at increasing concentrations on the deposition of calcium formate when acidizing with a high concentration of a formic acid precursor is illustrated by this example.

A solution of 25% w/v of ORCA FG formic acid precursor (a commercial product available from Cleansorb) were made up in deionized water and 40 ml was placed in a 50 ml plastic capped tube. 5 g of calcium carbonate (5 micron) was added to the tube and the tube was incubated at 90° C. for 24 hours. This period of time is known to be sufficient to allow full hydrolysis of the formic acid precursor. At the higher concentrations of sodium lactate and sodium gluconate, the deposition of calcium formate was abolished.

Example 4

The effect of adding lactate and gluconate salts at increasing concentrations on the deposition of calcium formate when acidizing with a high concentration of a formic acid precursor is illustrated by this example. A solution of 37.5% w/v of ORCA FG3 formic acid precursor (a commercial product available from Cleansorb) were made up in deionized water and 40 ml was placed in a 50 ml plastic capped tube. 5 g of calcium carbonate (5 micron) was added to the tube and the tube was incubated at 90° C. for 24 hours. This period of time is known to be sufficient to allow full hydrolysis of the formic acid precursor.

At the higher concentrations of sodium lactate and sodium gluconate the deposition of calcium formate was abolished.

TABLE 4

Effect of adding sodium gluconate and sodium lactate on the presence of calcium formate crystals in spent acidizing solutions based on ORCA FG3 formic acid precursor heated to 90° C for 24 Initial concentration of ORCA FG3 formic acid precursor 37.5% w/v*

Concentration of sodium gluconate and sodium lactate M (each)

| | 0.2M | 0.4M | 0.6M | 0.8M | 1.0M |
|---|---|---|---|---|---|
| Calcium formate present | Yes | Yes | Slight | None | None |

*sufficient to dissolve approximately 150 g of calcium carbonate per litre of formic acid precursor solution.

The invention claimed is:

1. A process comprising:
    providing a treatment fluid used for acidizing to a wellbore, the treatment fluid comprising:
        formic acid or a formic acid precursor;
        a suitable salt of lactic acid; and
        a suitable salt of gluconic acid;
    introducing the treatment fluid into the underground formation; and
    allowing the formic acid, or formic acid produced from hydrolysis of the formic acid precursor, to react with acid soluble material in the underground formation to generate soluble calcium salts.

2. The process of claim 1 wherein the treatment fluid with the salts of lactic acid and gluconic acid reduce formation of calcium crystals as compared to treatment fluids without salts of lactic acid and gluconic acid.

3. The process of claim 1 wherein the formic acid precursor is an ester or orthoester.

4. The process of claim 1 wherein the formic acid precursor is an ester of formic acid with diethylene glycol, ethylene glycol or glycerol.

5. The process of claim 1 where the formic acid precursor is one or more of diethylene glycol monoformate, diethylene glycol diformate, ethylene glycol monoformate, ethylene glycol diformate, glycerol monoformate, glycerol diformate or glycerol triformate.

6. The process of claim 1 wherein the salt of lactic acid is sodium lactate, potassium lactate or ammonium lactate.

7. The process of claim 1 wherein the salt of gluconic acid is sodium gluconate, potassium gluconate or ammonium gluconate.

8. The process of claim 1 further comprising:
    substantially preventing deposition of calcium formate crystals that would otherwise occur in the absence of the salt of lactic acid and the salt of gluconic acid.

9. The process of claim 1 wherein the concentration of the salt of lactic acid and the salt of gluconic acid is at least about 0.6 M or higher.

10. The process of claim 1 wherein the salt of lactic acid and the salt of gluconic acid are present in approximately equimolar concentration.

11. The process of claim 1 wherein the acid soluble material is present in the formation, a filter cake or deposited scales.

12. The process of claim 1 wherein the acid soluble material is calcium carbonate, calcium magnesium carbonate, chalk, dolomite, marble, calcite, or aragonite.

13. The process of claim 1 wherein the treatment fluid includes a polymer breaker.

14. The process of claim 1 where the polymer breaker is an oxidant or an enzyme.

15. The process of claim 1 further comprising:
    stimulating production from the formation, removing a filter cake or removing scale with the treatment fluid.

16. The process of claim 1, wherein the treatment fluid that is provided, or the mixture that is provided, does not contain an acidic buffering agent.

17. The process of claim 1, wherein the treatment fluid that is provided, or the mixture that is provided, is not acidic.

18. The process of claim 1, wherein the treatment fluid that is provided, or the mixture that is provided, has a pH of at least 4 or at least or at least 6.

19. The process of claim 1, wherein the treatment fluid that is provided, or the mixture that is provided, does not contain an alkyl glucoside surfactant.

20. A process comprising:
    providing a mixture to a wellbore comprising:
        formic acid or a formic acid precursor;
        a salt of lactic acid; and
        a salt of gluconic acid
    introducing the mixture into the underground formation wherein the concentration of the salt of lactic acid and the salt of gluconic acid prevent or at least reduce the formation of formate crystals as compared to mixtures without the salt of lactic acid or the salt of gluconic acid; and
    allowing the formic acid, or formic acid produced from hydrolysis of the formic acid precursor, to react with acid soluble material in the underground formation to generate soluble calcium salts.

21. The process of claim 20 wherein the concentration of the salt of lactic acid is substantially similar to the salt of gluconic acid.

22. The process of claim 20 wherein the concentration of the salt of lactic acid and the salt of gluconic acid is at least about 0.6 M or higher.

23. The process of claim 20 wherein the salt of lactic acid is sodium lactate, potassium lactate or ammonium lactate.

24. The process of claim 20 wherein the salt of gluconic acid is sodium gluconate, potassium gluconate or ammonium gluconate.

* * * * *

UNITED STATES PATENT AND TRADEMARK OFFICE
CERTIFICATE OF CORRECTION

| | | |
|---|---|---|
| PATENT NO. | : 11,999,898 B2 | |
| APPLICATION NO. | : 18/034271 | |
| DATED | : June 4, 2024 | |
| INVENTOR(S) | : Ralph Edmund Harris | |

It is certified that error appears in the above-identified patent and that said Letters Patent is hereby corrected as shown below:

In the Claims

In Claim 18, Column 8, Line 23, please insert --5-- after "pH of at least 4 or at least" therefore.

Signed and Sealed this
Thirtieth Day of July, 2024

Katherine Kelly Vidal
*Director of the United States Patent and Trademark Office*